United States Patent [19]

Sprauer, Jr.

[11] Patent Number: 5,750,967
[45] Date of Patent: May 12, 1998

[54] MICROWAVABLE CONTAINER WITH STEAM VENT VALVE

[76] Inventor: Joseph E. Sprauer, Jr., 99 Brooklyn Heights Rd., Rhinebeck, N.Y. 12572

[21] Appl. No.: 668,623

[22] Filed: Jun. 19, 1996

[51] Int. Cl.$^6$ .................... H05B 6/80; B65D 81/34
[52] U.S. Cl. ............... 219/735; 219/725; 99/DIG. 14; 426/118; 426/243; 426/109; 220/367.1
[58] Field of Search .................. 219/735, 725, 219/734; 99/DIG. 14; 426/107, 113, 109, 118, 234, 243; 220/367.1, 373

[56] References Cited

U.S. PATENT DOCUMENTS

| | | |
|---|---|---|
| 3,859,819 | 1/1975 | Kaplan . |
| 4,439,656 | 3/1984 | Peleg ......................... 219/734 |
| 4,490,579 | 12/1984 | Mengel ....................... 219/735 |
| 4,529,089 | 7/1985 | Gasbarra et al. ............. 426/109 |
| 4,630,671 | 12/1986 | Sherman et al. . |
| 5,229,563 | 7/1993 | Isogai et al. ................ 219/735 |
| 5,231,850 | 8/1993 | Morris . |
| 5,241,835 | 9/1993 | Ascone . |
| 5,307,647 | 5/1994 | McClure . |
| 5,310,981 | 5/1994 | Sarnoff et al. .............. 219/735 |
| 5,315,083 | 5/1994 | Green ......................... 219/734 |
| 5,345,069 | 9/1994 | Grindrod . |

FOREIGN PATENT DOCUMENTS 3-69482   3/1991   Japan .................... 219/735

*Primary Examiner*—Philip H. Leung
*Attorney, Agent, or Firm*—Terrance L. Siemens

[57] ABSTRACT

A food container having provision for storing a freezable chilling medium and having a valve for venting steam. The food container is divided into a food storage chamber and a chilling chamber for holding the chilled medium. These chambers are separated by a wall having an opening at the top enabling fluid communication between these chambers. The container is closed by a removable lid. A steam relief valve is disposed in the lid, sunken into a depression formed in the lid, so that the valve body is substantially flush with the lid. A handle in the form of ears projects from the valve for easy grasping. The valve is opened for microwave cooking of stored food, and closed for chilled storage. When heating, the chilled medium is removed. Optionally, water is placed in the empty chilling chamber, and steam generated upon heating migrates into the food storage chamber, thereby steaming the food.

11 Claims, 1 Drawing Sheet

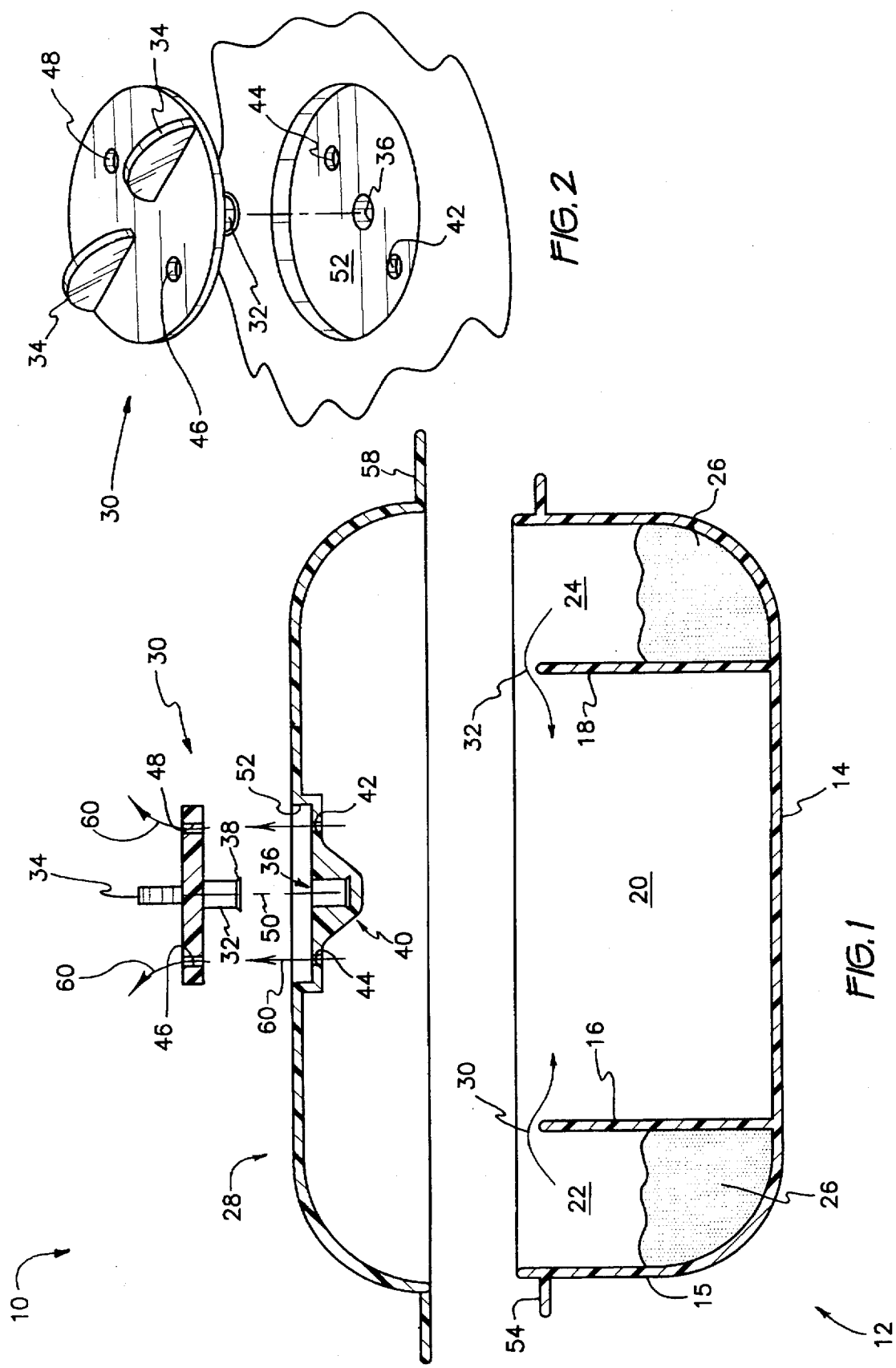

MICROWAVABLE CONTAINER WITH STEAM VENT VALVE

BACKGROUND OF THE INVENTION

1. Field of the Invention

The present invention relates to a container primarily intended for storing food. The container is constructed so as to be usable in a microwave oven, and incorporates a valve for venting steam generated when subjecting contents of the container to microwaves. The container has three chambers which, although separated by walls, remain in communication with one another. A cover seals the container and carries the steam vent valve.

The center chamber is the principal chamber, and is intended to store food. The two remaining chambers are smaller, and surround the principal chamber. It is intended that freezable icepacks be placed in the small chambers for chilling foodstuffs prior to cooking. The novel container thus stores foodstuffs under chilled conditions, and the same container may be readily employed to cook the stored foodstuffs by microwave action.

2. Description of the Prior Art

As economies develop, food handling practices have changed accordingly. Foods are now intended to be stored prior to consumption, particularly under chilled conditions. Simultaneously, rapid cooking, particularly by microwave ovens, has also become popular. Containers for accommodating these practices have become available.

Generally, however, containers are dedicated primarily to chilling or to microwave heating, but not both. These containers typically accommodate insertion of a refreezable fluid or gel, either separately enclosed and removable, or permanently entrapped within the container. Reusable containers including such chilled medium chambers are well known in the prior art. Several examples will be discussed.

U.S. Pat. No. 5,241,835, issued to David Ascone on Sep. 7, 1993, describes a food container having two storage chambers for containing foodstuffs. A third chamber encloses a freezable substance for maintaining the foodstuffs chilled. A valve enables communication between the two food storage chambers. Unlike the present invention, Ascone's valve does not vent to the exterior of the food container. Also, the chilling chamber does not communicate with the food storage chambers. Still further, each chamber has its own closure, rather than a single common closure seen in the present invention.

A container suitable for both chilling and for heating by microwaves is shown in U.S. Pat. No. 5,345,069, issued to Paul E. Grindrod on Sep. 6, 1994. The purpose of this container is to provide an easily opened, single use retail container which preserves foods. Abilities for accommodating heating and chilling are imparted by selecting appropriate constituent materials. This retail container lacks the venting valve, the plural intercommunicating chambers, and replaceable lid of the present invention.

Further chilling containers are shown in U.S. Pat. Nos. 3,859,819, issued to Marx Kaplan on Jan. 14, 1975, 4,630, 671, issued to Victor Sherman et al. on Dec. 23, 1986, and 5,231,850, issued to Richard Morris on Aug. 3, 1993. Although these containers each have a chamber for containing a chilled substance, there is no communication between the chill containing chamber and the storage container, as found in the present invention. Also, there is no valve communicating to the interior.

A device shown in U.S. Pat. No. 5,307,647, issued to Ralph K. McClure on May 3, 1994, differs in construction from those described above, but generally shares performance characteristics with this prior group. McClure fails to enable fluid communication between a chilled medium containing chamber and food storage chamber, and also lacks a valve communicating with the exterior of the container.

There remains the need for a container which accommodates both chilled storage of food and microwave heating, and which also is reusable. In regards to microwave heating, no prior art containers known to the applicant have provision for steaming contained foodstuffs.

None of the above inventions and patents, taken either singly or in combination, is seen to describe the instant invention as claimed.

SUMMARY OF THE INVENTION

The present invention provides a reusable container which both contains a refreezable medium and accommodates microwave heating. This combination is extremely practical, since it enables perishable food items to be prepared, then stored for time periods possibly exceeding a full day prior to cooking. The stored foods may then be placed in a microwave oven without being transferred to a special container intended for microwave heating. Thus, the present invention enables foods to be prepared, carried about without requiring special steps for chilling, and placed in a microwave oven for cooking.

The present invention shares basic construction with prior art containers, but introduces two significant improvements. One improvement is a valve which can be tightly closed during storage, and is opened to vent steam when heating by microwave.

A second improvement lies in the arrangement of two chambers for storing a chilled medium. These two chambers surround the food storage chamber, and are separated therefrom by walls. These walls are open at the top to enable communication between the chilled chambers and the food storage chamber. This arrangement both expedites heat transfer for chilling the food storage chamber, and also enables optional steaming of the food when cooking.

Food may be merely heated by microwaves, for which the chilled medium is removed from its chambers, and the food container is placed in a microwave oven. To steam the food, water is placed in the chilling chambers after removal of the chilling medium. Steam generated when this water boils responsive to microwave heating easily migrates to the food storage chamber through the openings formed in the walls separating chilling chambers from the main storage chamber.

The steam vent valve comprises a member which is rotably connected to the lid of the container. The valve member has holes which, when the valve member is rotated, become aligned with holes formed in the lid. The valve member includes projections enabling grasping by the user's fingers. The valve is thus manually moved to open and closed positions. The valve member is securely entrapped by the lid so that it is not easily lost. The valve nests within a cooperating depression formed in the lid so that it is not unduly obtrusive.

Chilling is performed in generally conventional manner, preferably employing a sealed enclosure filled with a freezable gel. This enclosure may be rigid and permanently formed, or may be flexible. If rigid, the enclosure is preferably configured to cooperate with the configuration of the chilling chambers. If flexible, it is preferably placed in the chilling chamber when melted, and subsequently frozen.

The flexible enclosure will then freeze in a configuration cooperating with the chilling chamber.

Accordingly, it is a principal object of the invention to provide a food storage container which is reusable, capable of storing a chilled medium, and suitable for microwave heating.

It is another object of the invention to provide egress for enabling steam generated when heating to escape.

It is a further object of the invention to provide chambers for storing chilled medium which are in fluid communication with the food storage container.

Still another object of the invention is to enable steaming of food when heating by microwaves.

An additional object of the invention is to assure that the steam relief valve be manually movable to open and closed positions.

It is again an object of the invention to arrange the valve not to be unduly obtrusive.

Yet another object of the invention is to enable ready grasp of the valve for opening and closing.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is an exploded, side elevational, cross sectional view of the invention.

FIG. 2 is an exploded, perspective detail view of the valve shown at the top center of FIG. 1.

DETAILED DESCRIPTION OF THE PREFERRED EMBODIMENTS

Turning now to FIG. 1 of the drawings, novel microwavable container 10 comprises a housing 12 having a floor or bottom wall 14 and a lateral wall 15 extending entirely around the perimeter of bottom wall 14. Two interior partition walls 16, 18 extend to each side of lateral wall 14, thereby dividing the interior of housing 12 into three chambers 20, 22, 24. The central chamber 20 is employed for food storage. The remaining chambers each accept insertion of a chilling medium 26, and hence are termed chilling chambers 22, 24.

Housing 12 is closed and sealed by a lid 28. When placed onto housing 12, lid 28 separates the interior of housing 12 from the exterior thereof, but does not seal each chamber 20, 22, or 24 from a neighboring chamber 20, 22, or 24. Instead, walls 16 and 18 are of a height creating an opening for enabling fluid communication between adjacent chambers, as indicated by arrows 30, 32. This opening is purposefully located at the top of walls 16 and 18. This arrangement expedites transfer of heat from chamber 20 to chambers 22 and 24, and also facilitates optional steaming of foodstuffs (not shown) when heating.

Steaming is performed by first removing chilling media 26, then placing a desired amount of water into either or both of chambers 22 and 24. Heating action will boil this water, and vapor (not shown) then migrates as indicated by arrows 30 and 32 into food storage chamber 20. Location of the opening for steam passage at the top of walls 16 and 18 enables temporary holding of water in chambers 22 and 24 for steaming purposes.

A valve is provided for venting steam generated during heating. The valve is preferably located on lid 28, although it could, if desired, be located on housing 12. The valve is disposed in fluid communication between food storage chamber 20 and the exterior of container 10. Of course, due to openings located above walls 16 and 18, the valve necessarily also enables fluid communication between chambers 22, 24 and the exterior of container 10.

The valve comprises a valve body 30 having a stem 32 attached to and depending from valve body 30, and a handle or ears 34 attached to and projecting upwardly from valve body 30. Ears 34 enable valve body 30 to be readily grasped and moved into an open position and a closed position, as will be described more fully hereinafter.

Valve body 30 is rotatably retained against lid 28 by stem 32. Stem 32 occupies a cylindrical bore 36 configured just large enough to enable rotation of stem 32. Stem 32 will be seen to have a small flange 38. Bore 36 has a corresponding groove 40 for receiving flange 38. This arrangement retains valve body 30 in contact with lid 28. This contact is maintained when the valve is both open and closed, in order to exclude contaminants from interfering with valve operation and from entering chamber 20.

The valve arrangement includes at least one and preferably two openings 42, 44 formed in lid 28 and enabling communication between chamber 20 and the exterior of container 10. Valve body 30 opens and closes openings 42 and 44 by the following arrangement. Valve body 30 has two orifices 46, 48 which are alignable with openings 42, 44 when valve body 30 is appropriately rotated about axis 50 of stem 32. The valve is operated by turning or rotating valve body 30 by grasping ears 34. Optionally, indicia (not illustrated), such as arrows indicating rotation, or written instructions, may be provided to suggest to a user that the valve is operated by rotation. This concept is reinforced by provision of two small ears 34 rather than a single, large, centrally located handle (not shown).

FIG. 2 better illustrates construction of the valve. In particular, both ears 34 are clearly seen. Also, openings 42 and 44 and corresponding orifices 46 and 48 are clearly seen. Depression 52 may be of greater diameter than that of valve body 30, or may alternatively provide a close fit.

Returning to FIG. 1, the valve is recessed into lid 28 so as to be substantially flush therewith and unobtrusive. Lid 28 has a depression 52 formed therein. Depression 52 is dimensioned and configured so that the upper surface of valve body 30 is flush with the upper surface of lid 28 when valve body 30 occupies depression 52 after assembly of the valve.

In other respects, container 10 may follow conventional practice, such as selection of a constituent material. Also, certain features typically provided for food storage containers, such as outwardly projecting flange 54 formed in housing 12, and outwardly projecting tabs 56, 58 formed in lid 28. Flange 54 and tabs 56, 58 enable convenient grasping and manipulating of container 10. For example, lid 28 is readily grasped and pried from engagement with housing 12 by tabs 56, 58, which extend beyond flange 54 for accessibility.

When foodstuffs are being stored under chilled conditions, the valve is closed to exclude bacteria and other contaminants from chamber 20, and a suitable chilling medium is placed in one or both of chambers 22 and 24. The foodstuffs may remain in good condition under these conditions for a protracted period of time. When it is desired to heat the foodstuffs, the chilled medium is removed and container 10 is placed in a microwave oven. The valve is opened to allow escape of vapors generated by heating water present in the foodstuffs. If optional steaming is performed, this steam also escapes through the valve, as indicated by arrows 60.

It will occur to those of skill in the art that the present invention may be modified in various ways without departing from the spirit of the invention. For example, the valve may employ motions other than rotary. Also, valve body 30 may be readily or intentionally removable, if desired. Any number, configuration, and location of steam outlets may be provided in the valve.

Overall dimensions and configuration may be at the designer's discretion. The inventor contemplates that an overall length of twelve inches, an overall width of about seven inches, and an interior depth of three and one half inches would efficiently and effectively contain a typical meal for one person. Preferably, the overall configuration is parallelepiped, with rounded corners. Tabs 56 and 58 are best located at corners of lid 28.

It is to be understood that the present invention is not limited to the embodiments described above, but encompasses any and all embodiments within the scope of the following claims.

I claim:

1. A nonmetallic microwavable container for storing and heating foodstuffs, comprising:

a housing having a lateral wall, a bottom wall, and an interior partition wall dividing the interior of said housing into a food storage chamber and a first chilling chamber;

a lid sealing said food storage chamber and said first chilling chamber; and a valve for venting steam, disposed in fluid communication between said food storage chamber and the exterior of said microwavable container, said valve comprising a valve body and a first valve opening communicating between the interior of said container and the exterior of said container, said valve body disposed to open and to close said first valve opening, said container comprising a second valve opening formed in said container, said valve body rotatably disposed upon said container and rotatably movable to an open position and to a closed position, wherein said first valve opening is moved into alignment with said second valve opening in said open position and out of alignment with said second valve opening in said closed position.

said valve comprising a stem projecting downwardly from said valve body, said stem having a distal end, and a small flange projecting outwardly from said distal end of said stem, and said container having a cylindrical bore disposed to receive said stem and a groove disposed to receive said flange of said stem.

2. The container according to claim 1, said interior partition wall having opening means defining an opening communicating between said food storage chamber and said chilling chamber.

3. The container according to claim 2, said opening means being located at the top of said interior partition wall, whereby a liquid may be stored in said chilling chamber and vapors generated by boiling the liquid may migrate into said food storage chamber.

4. The container according to claim 1, said valve means being located on said lid of said container.

5. The container according to claim 1, further comprising a second interior partition wall dividing said housing to form a second chilling chamber, said first chilling chamber and said second chilling chamber arranged to surround said food storage chamber.

6. The container according to claim 1, said housing having an outwardly projecting flange, and said lid having an outwardly projecting tab extending beyond said housing, whereby said lid is readily grasped for being pried from said housing.

7. The container according to claim 1, said valve body having a handle projecting from said valve body, whereby said valve body is readily grasped and rotated into the open position and into the closed position.

8. The container according to claim 1, said container having means defining a depression therein, said valve body disposed to occupy said depression, whereby said valve body is unobtrusive.

9. A nonmetallic microwavable container for storing and heating foodstuffs, comprising:

a housing having a lateral wall, a bottom wall, and an interior partition wall dividing the interior of said housing into a food storage chamber and a first chilling chamber, said interior partition wall having opening means defining an opening communicating between said food storage chamber and said chilling chamber, said opening means being located at the top of said interior partition wall, whereby a liquid may be stored in said chilling chamber and vapors generated by boiling the liquid may migrate into said food storage chamber;

a lid sealing said food storage chamber and said first chilling chamber; and a valve for venting steam, located on said lid of said container and disposed in fluid communication between said food storage chamber and the exterior of said microwavable container, said valve comprising a valve body having a stem attached to and depending from said valve body, said stem having a flange, and a handle attached to and projecting upwardly from said valve body, whereby said valve body is readily grasped and rotated into an open position and into a closed position, said lid of said container having a bore for receiving said stem, said bore configured to be just large enough to enable rotation of said stem, said bore having a groove corresponding to and receiving said flange of said stem, thereby maintaining said valve body in contact with said container, whereby contaminants are excluded from said valve means, said lid of said container having a depression therein, said value body disposed to occupy said depression, whereby said valve body is unobtrusive.

10. The container according to claim 9, further comprising a second interior partition wall dividing said housing to form a second chilling chamber, said first chilling chamber and said second chilling chamber arranged to surround said food storage chamber.

11. The container according to claim 9, said housing having an outwardly projecting flange, and said lid having an outwardly projecting tab extending beyond said housing, whereby said lid is readily grasped for being pried from said housing.

* * * * *